No. 693,769. Patented Feb. 18, 1902.
A. F. WOODS.
APPARATUS FOR LOADING MANURE, &c., ON WAGONS.
(Application filed Oct. 24, 1901.)

(No Model.)

UNITED STATES PATENT OFFICE.

ALEXANDER F. WOODS, OF MURPHY, IOWA.

APPARATUS FOR LOADING MANURE, &c., ON WAGONS.

SPECIFICATION forming part of Letters Patent No. 693,769, dated February 18, 1902.

Application filed October 24, 1901. Serial No. 79,796. (No model.)

*To all whom it may concern:*

Be it known that I, ALEXANDER F. WOODS, a citizen of the United States, residing at Murphy, in the county of Jasper and State of Iowa, have invented a new and useful Apparatus for Loading Manure, &c., on Wagons, of which the following is a specification.

My object is to save time and labor in loading manure, loose ground, &c., on a wagon as required to haul it from one place to another.

My invention consists in a frame and pulley-bearer adapted to be detachably fixed to a wagon-box and arranged and combined with a wagon-box and coöperated with scrapers, as hereinafter set forth, pointed out in my claims, and illustrated in the accompanying drawings, in which—

Figure 1:
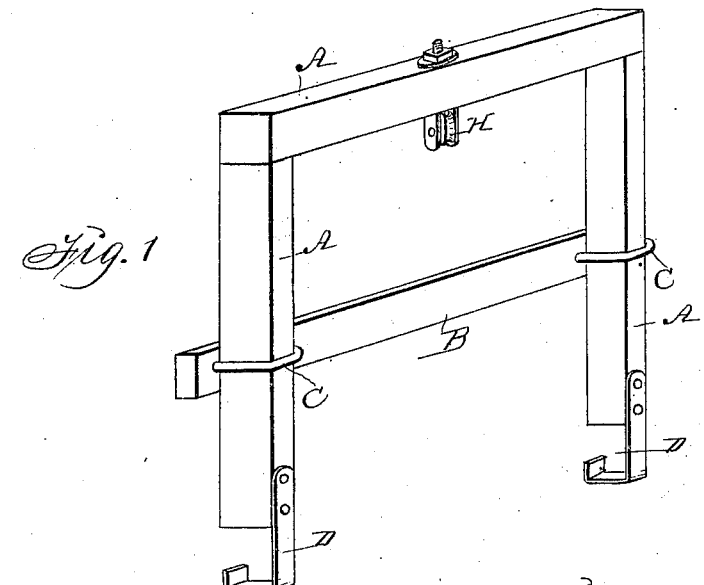
Figure 2:
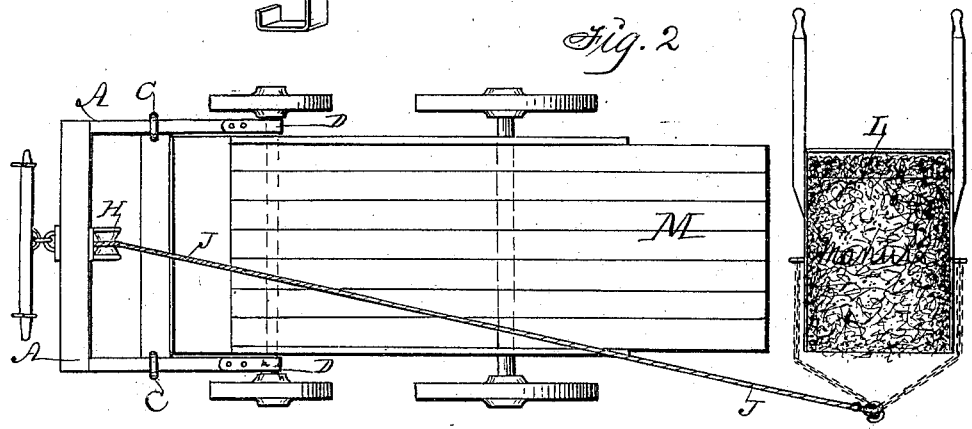
Figure 3:
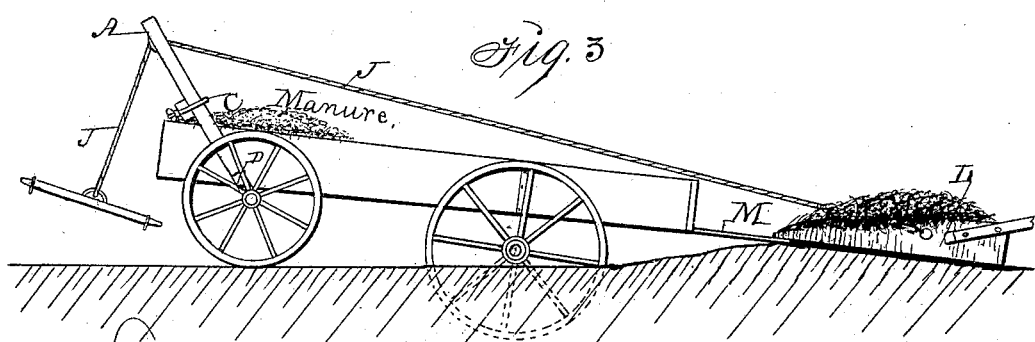

Figure 1 is a perspective view of a pulley-bearer adapted to be detachably fastened to the front portion of a wagon. Fig. 2 is a top view of the complete apparatus, showing all the operative parts in position relative to a wagon as required for practical use. Fig. 3 is a side elevation showing the position of the wagon relative to the surface of the ground and a loaded scraper in position as required to be elevated to the top of the wagon by means of horse-power.

The letter A designates the pulley-bearer in the form of a frame, composed, preferably, of two uprights made of angular wooden bars four inches wide and two inches thick and a cross-piece four by four inches fixed to the tops of the uprights by means of mortises and tenons and nails or in any suitable way.

An adjustable cross-piece B, made of wood, corresponding in size with the uprights, is adjustably connected with the uprights, by means of clamping-bolts C and nuts on their screw-threaded ends in such a manner that the cross-piece can be utilized advantageously for fastening the frame to a wagon.

Metal hooks D are fixed to the lower ends of the uprights of the frame in such a manner that the free ends of the hooks can be slipped under the ends of the bolster of a wagon for fastening the frame to the wagon to project upward and incline forward, as shown in Fig. 2.

By simply placing the hooks D in contact with the projecting ends of the bolster at the front of a common farm-wagon and then fixing the adjustable cross-piece B to the uprights of the frame of the pulley-bearer frame in such a manner that the cross-piece will rest upon the top edges of the side-boards of the wagon-box the frame will be securely and detachably fastened in place as required for practical use.

A pulley H is swiveled to the center of the top of the frame A and a rope or cable J extended over the pulley and a singletree K, fixed to the front end of the cable for hitching a horse thereto in front of the wagon, and the rear end of the cable is detachably connected with a scraper L by means of a hook and eye, as shown, or in any suitable way.

When a wagon is placed in position, as shown in Fig. 1, by lowering the hind wheels into pits and the floor M of the wagon-box extended rearward and inclined downward, it is obvious the scraper when detached from the cable J can be loaded by means of horses hitched thereto and moved in a common way to the rear end of the bottom of the wagon-box and the horses then detached therefrom and the cable connected therewith, so that a horse hitched to the front end of the cable can pull the loaded scraper to the forward portion of the wagon-box to be emptied thereon by a person on the wagon and then returned to the surface of the ground in rear of the wagon and detached from the rope to be again loaded and such operation repeated until the wagon-box is filled.

Having thus described the purpose of my invention and the arrangement and combination of each part relative to a wagon, the practical operation and utility of the apparatus as a means of facilitating loading a wagon and saving manual labor and time in handling and moving manure, &c., will be readily understood by persons familiar with the art to which it pertains.

What I claim as new, and desire to secure by Letters Patent, is—

1. A pulley-bearer composed of two uprights, a fixed cross-piece at the tops of the uprights, a cross-piece adjustable at the central portions of the uprights, fixed hooks at the lower ends of the uprights and a pulley attached to the central portion of the fixed cross-piece at the top of the frame, in combination with the bolster and box of a wagon, for the purposes stated.

2. An apparatus for loading manure, &c., on a wagon, comprising a wagon having a box and the rear end of the floor of the box adapted to be placed in contact with the ground, a frame composed of two uprights having hooks at their lower ends, a cross-piece fixed to the tops of the uprights, a cross-piece adjustably connected with the uprights, a pulley-bearer connected with the fixed cross-piece at the top of the uprights, a rope or cable extended over the pulley and means for hitching a horse to its front end, a scraper and means for detachably connecting the scraper with the rear end of the cable, arranged and combined to operate in the manner set forth for the purposes stated.

ALEXANDER F. WOODS.

Witnesses:
W. O. McELROY,
GUSSIE GRIEBELING.